(12) United States Patent
Wallbott et al.

(10) Patent No.: US 9,821,911 B2
(45) Date of Patent: Nov. 21, 2017

(54) TROLLEY ARRANGEMENT OF AN AIRCRAFT GALLEY

(71) Applicant: Sell GmbH, Herborn (DE)

(72) Inventors: Tim Wallbott, Lahnau (DE); Samuel Klassen, Haiger (DE)

(73) Assignee: SELL GmbH, Herborn (DE)

( * ) Notice: Subject to any disclaimer, the term of this patent is extended or adjusted under 35 U.S.C. 154(b) by 0 days.

(21) Appl. No.: 15/312,103

(22) PCT Filed: Aug. 31, 2015

(86) PCT No.: PCT/EP2015/069827
§ 371 (c)(1),
(2) Date: Nov. 17, 2016

(87) PCT Pub. No.: WO2016/034531
PCT Pub. Date: Mar. 10, 2016

(65) Prior Publication Data
US 2017/0166310 A1    Jun. 15, 2017

Related U.S. Application Data

(60) Provisional application No. 62/046,390, filed on Sep. 5, 2014.

(51) Int. Cl.
*B25J 1/08*   (2006.01)
*B64D 11/04*  (2006.01)
*B64D 11/00*  (2006.01)
*B25J 1/04*   (2006.01)

(52) U.S. Cl.
CPC ............ *B64D 11/0007* (2013.01); *B25J 1/04* (2013.01); *B25J 1/08* (2013.01); *B64D 11/04* (2013.01); *Y02T 50/46* (2013.01)

(58) Field of Classification Search
CPC ........ B64D 11/0007; B64D 11/04; B25J 1/02; B25J 1/04; B25J 1/08; B25J 1/10; B66F 19/00; A47F 13/06; Y02T 50/46
USPC ..... 294/15, 175, 191, 209, 210; 280/47.371; 244/118.1, 118.5; 414/416.04, 679
See application file for complete search history.

(56) References Cited

U.S. PATENT DOCUMENTS 6,305,643 B1 * 10/2001 Sankrithi ........... B64D 11/0007
                                                    244/118.1
7,201,385 B2 *  4/2007 Renz .......................... B62B 3/02
                                                    280/47.34
(Continued)

*Primary Examiner* — Dean Kramer
(74) *Attorney, Agent, or Firm* — Andrew Wilford

(57) ABSTRACT

A trolley arrangement for a galley of an aircraft has a trolley container in which at least two trolleys can be arranged in a longitudinal direction and a trolley-handling device for pulling and pushing a trolley longitudinally into the trolley container. This device has a linear guide with a stationary guiding bar and a slide movable along the guiding bar longitudinally, a pulling and pushing bar extending along a longitudinal axis, axially fixed on the slide, but rotatable about the longitudinal axis, a hook at a distal end of the pulling and pushing bar remote from the slide, a handling bar axially fixed on the slide or on the pulling and pushing bar, and a joint between the handling bar and the slide or the pulling and pushing bar, so that the handling bar and the pulling and pushing bar are axially connected and are rotationally coupled.

14 Claims, 10 Drawing Sheets

(56) References Cited

U.S. PATENT DOCUMENTS

| | | | | |
|---|---|---|---|---|
| 7,490,880 | B1* | 2/2009 | Matsui | A47F 13/06 |
| | | | | 294/210 |
| 7,673,912 | B2* | 3/2010 | Breininger | B25B 9/00 |
| | | | | 294/210 |
| 7,980,608 | B2* | 7/2011 | Pouliot | B65G 7/02 |
| | | | | 294/15 |
| 2013/0259612 | A1 | 10/2013 | Guering | |
| 2014/0166806 | A1 | 6/2014 | Durand | |
| 2015/0367942 | A1 | 12/2015 | Parry | |

\* cited by examiner

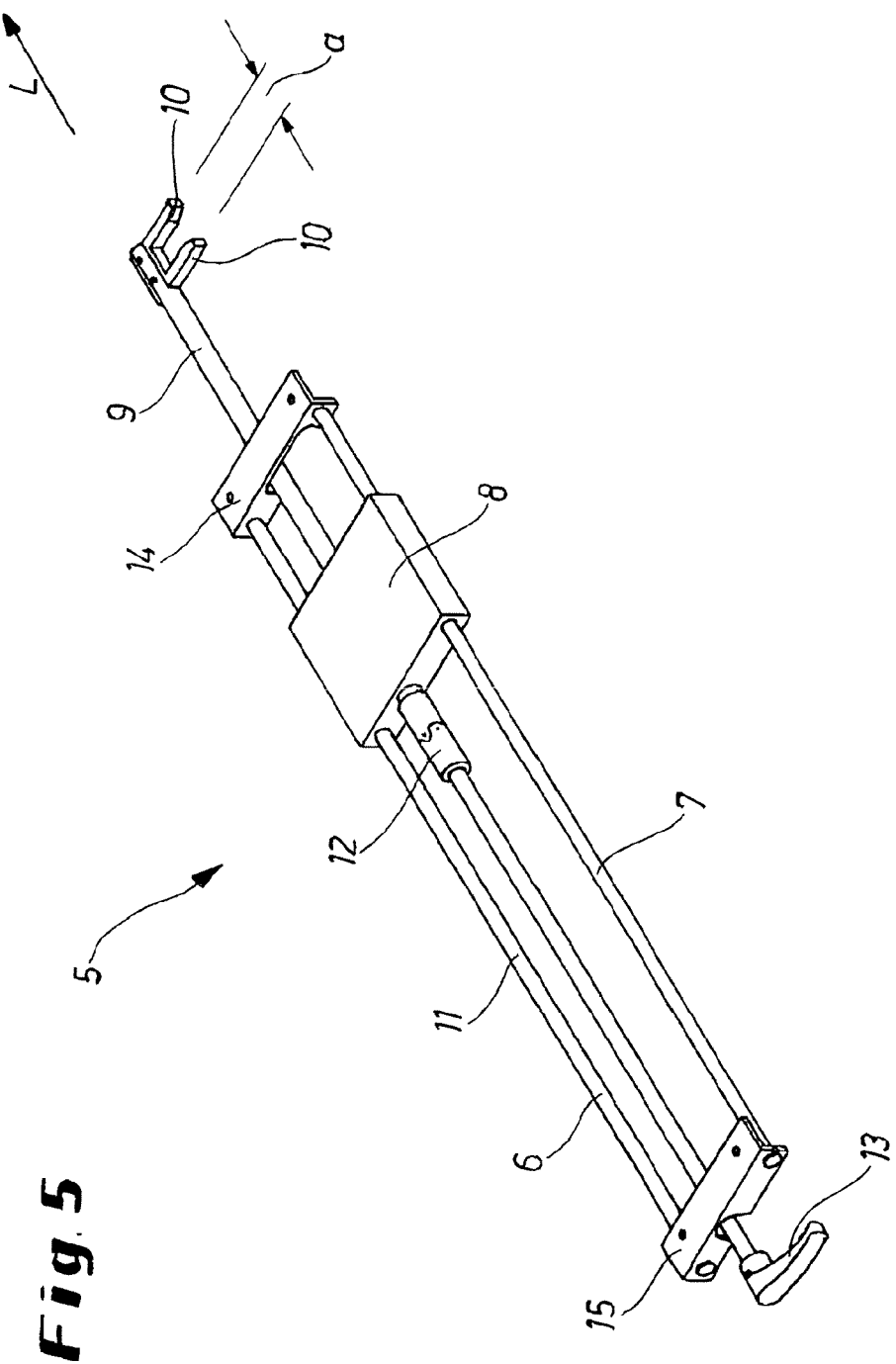

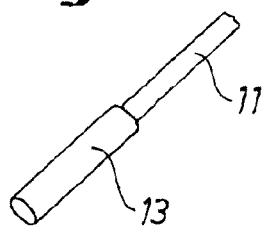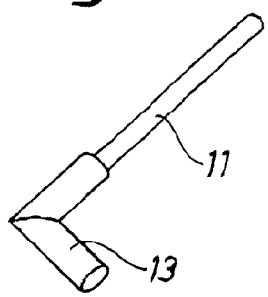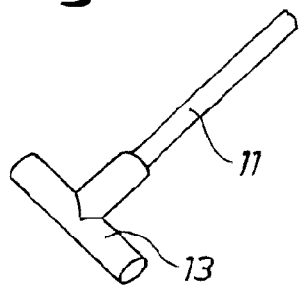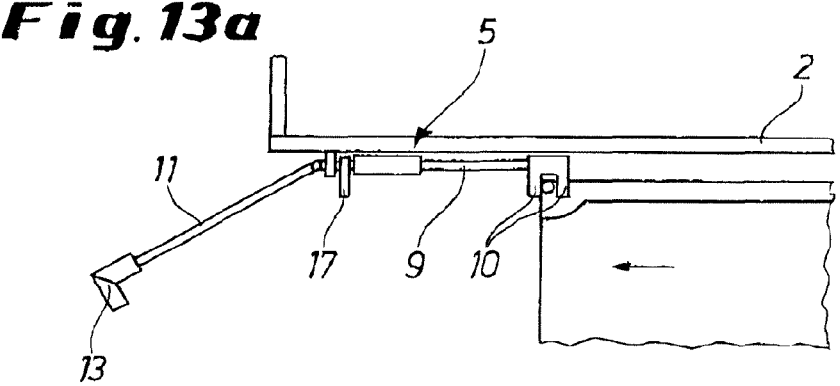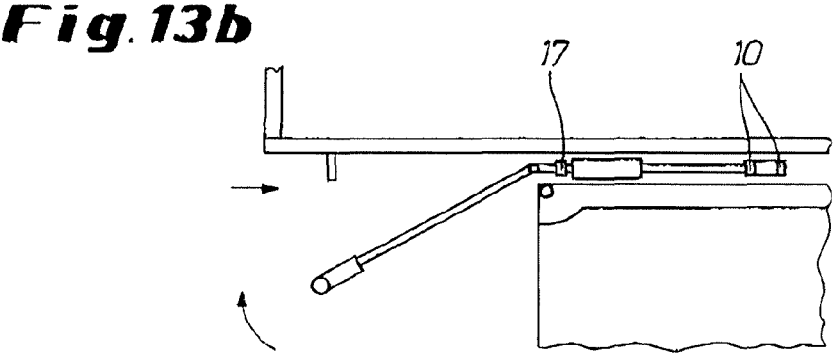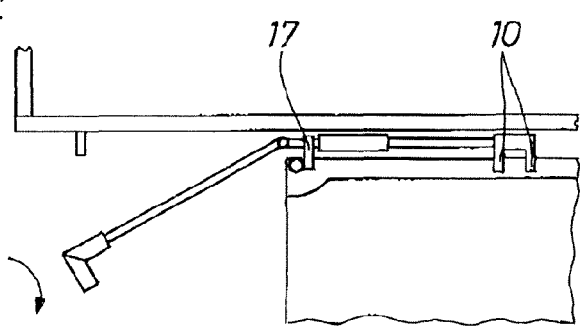

TROLLEY ARRANGEMENT OF AN AIRCRAFT GALLEY

CROSS REFERENCE TO RELATED APPLICATIONS

This application is the US-national stage of PCT application PCT/EP2015/069827 filed 31 Aug. 2015 and claiming the priority of American patent application 62/046,390 itself filed 5 Sep. 2014.

FIELD OF THE INVENTION

The invention relates to a trolley arrangement of a galley of a vehicle, especially of an aircraft, wherein the trolley arrangement comprises a trolley container in which at least two trolleys can be arranged along a longitudinal direction, wherein the trolley arrangement furthermore comprises a trolley handling device for pulling and pushing a trolley longitudinally into the trolley container.

BACKGROUND OF THE INVENTION

A generic trolley arrangement is known from WO 2014/125046 A1. Here, trolleys can be pulled out of a trolley container, wherein (at least) two trolleys are arranged longitudinally one after another. The handling device is here a simple rod with a hook at its end for pulling the rear trolley out of the container. Problems occur when the used trolleys have to be pushed into the container again. The pre-known device is not suitable to securely push in all trolleys into the trolley container. Thus, with pre-known trolley arrangement it is possible to pull out trolleys from the trolley container; but it is not possible to securely push back trolleys into the container again after use.

OBJECT OF THE INVENTION

Thus, it is an object of the present invention to further develop a trolley arrangement of the generic kind that allows to facilitate the handling of the trolleys when storing them in the trolley container and taking them out of the same.

SUMMARY OF THE INVENTION

The solution of this object by the invention is characterized in that the trolley-handling device comprises
a linear guide with at least one stationary guiding bar and a slide movable longitudinally along the at least one guiding bar,
a pulling and pushing bar axially fixed at the slide but that can rotate around its longitudinal axis, wherein at least one hook is at the distal end of the pulling and pushing bar remote from the slide, and
a handling bar axially fixed at the slide or at the pulling and pushing bar, wherein a joint is between the handling bar and the slide or the pulling and pushing bar, so that the handling bar and the pulling and pushing bar are axially connected and are rotationally coupled.

The joint is preferably a cardan joint. In general each type of joint can be employed, e.g. a ball joint, a universal joint, a spring joint.

The joint can have a stop that limits the angle between the pulling and pushing bar and the handling bar.

The trolley-handling device is preferably arranged in the upper region of the trolley container at its inner side.

A handling grip can be arranged at the distal end of the handling bar remote from the slide. Thereby, it is possible that the handling grip is at the same height as at least one locking bolt at a galley front for locking of the trolleys in the trolley container.

The trolley-handling device can furthermore comprise two stops that longitudinally limit the movement of the slide.

According to a possible embodiment a single hook can be arranged at the distal end of the pulling and pushing bar.

Alternatively, two hooks can be arranged at the distal end of the pulling and pushing bar. In this case it can be provided that the two hooks are preferably parallel to another at a defined distance.

At least one of the hooks can be arranged at the pulling and pushing bar by means of a hinge-joint. The hinge-joint can thereby comprise a spring element that biases the hook against a stop.

A further embodiment of the invention proposes that a further hook is at the pulling and pushing bar adjacent to the joint. This allows a further improved handling of trolleys.

The linear guide has preferably two stationary guiding bars that are parallel to another and extend longitudinally.

Thus, the arm-like trolley-handling device allows pulling out and pushing in of a trolley into the trolley container especially in the galley of an aircraft. By the proposed device the trolleys can easily be reached even if they are in the rear part or position in the trolley container. It is not necessary that a user must grab deeply below the working area of the galley (on top of the trolley container) to reach all trolleys in the container. So, the device according to the invention increases the comfort of use and allows a quick and easy pulling out and pushing in of a trolley during flight. For example, by the proposed arrangement two full-size trolley (at least 1.5 trolleys) can be parked one after another.

Beneficially, the proposed trolley-handling device allows an easy extraction and retraction of the trolley from the trolley container and into the same.

For each trolley row (if there are several side by side) one trolley-handling device can be arranged.

Also it is beneficial that the proposed trolley-handling device can easily withstand in-flight loads as defined by the authorities and the OEM specification.

BRIEF DESCRIPTION OF THE DRAWING

In the drawings embodiments of the invention are shown.

FIG. 5 is a perspective view of the trolley-handling device in an alternative embodiment, FIG. 10 is a perspective view of an end of the handling bar with a handling grip according to a first embodiment of the grip, FIG. 11 is a perspective view of an end of the handling bar with a handling grip according to a second embodiment of the grip, FIG. 12 is a perspective view of an end of the handling bar with a handling grip according to a third embodiment of the grip, FIG. 13a is a side view of the trolley container with a trolley in it with a trolley-handling device according to another embodiment of the invention during taking out of the trolley from the container, FIG. 13b is a side view of the trolley container at a later stage during taking out of the trolley from the container, FIG. 13c is a side view of the trolley container at a later stage as in FIG. 13b.

SPECIFIC DESCRIPTION OF THE INVENTION

Figure 1:
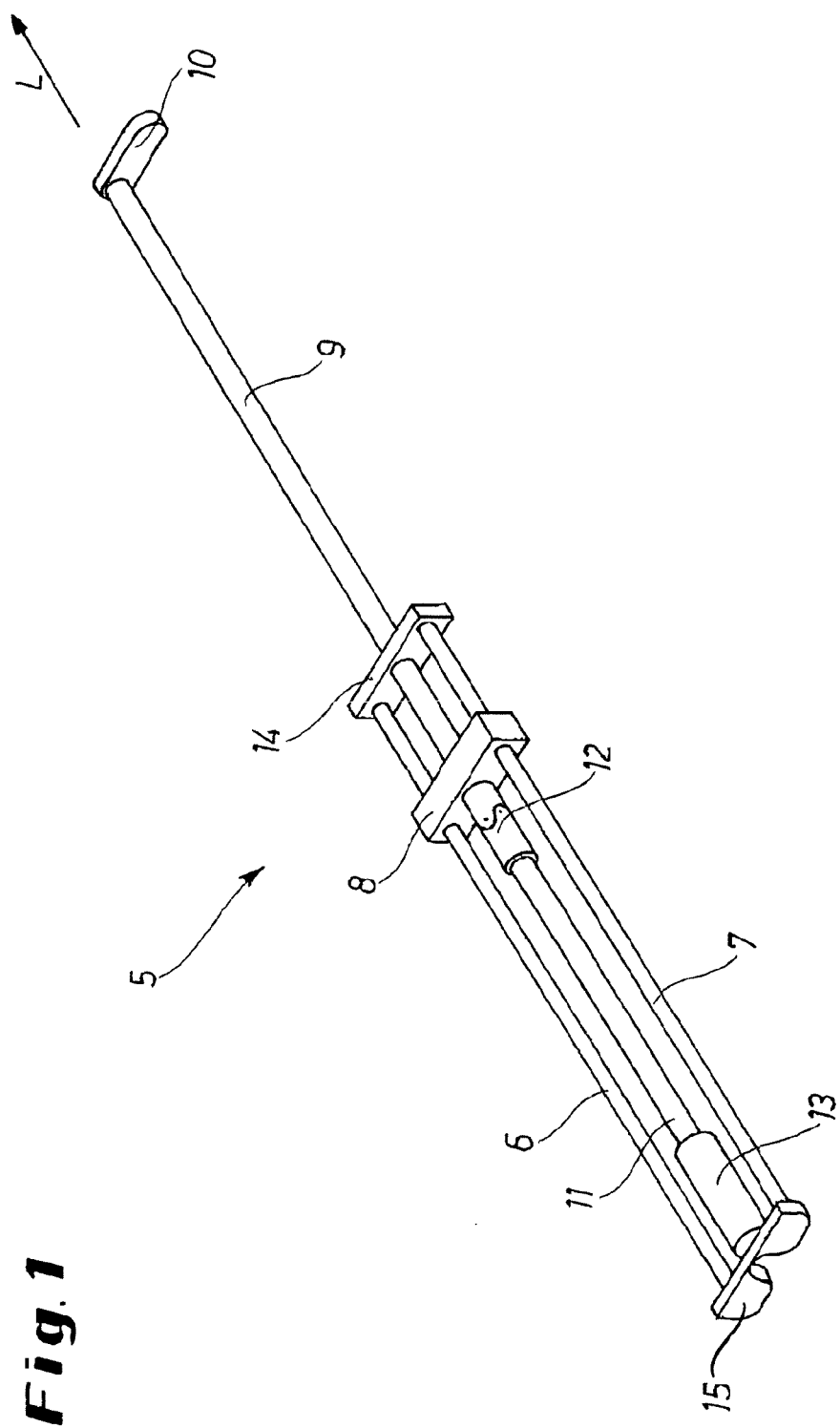
FIG. 1 is a perspective view of a trolley-handling device in an extended position.

In the drawing a trolley arrangement 1 of a galley of an aircraft is shown and described. The arrangement comprises a trolley container 2 in which two trolleys can be arranged one after another. At the bottom side of the top plate of the trolley container 2 a trolley-handling device 5 is provided that allows an easy pulling out and pushing in of the trolleys 3, 4 from and into the trolley container 2. During handling of the trolleys 3, 4 the same are moved into a longitudinal direction L.

Figure 2:
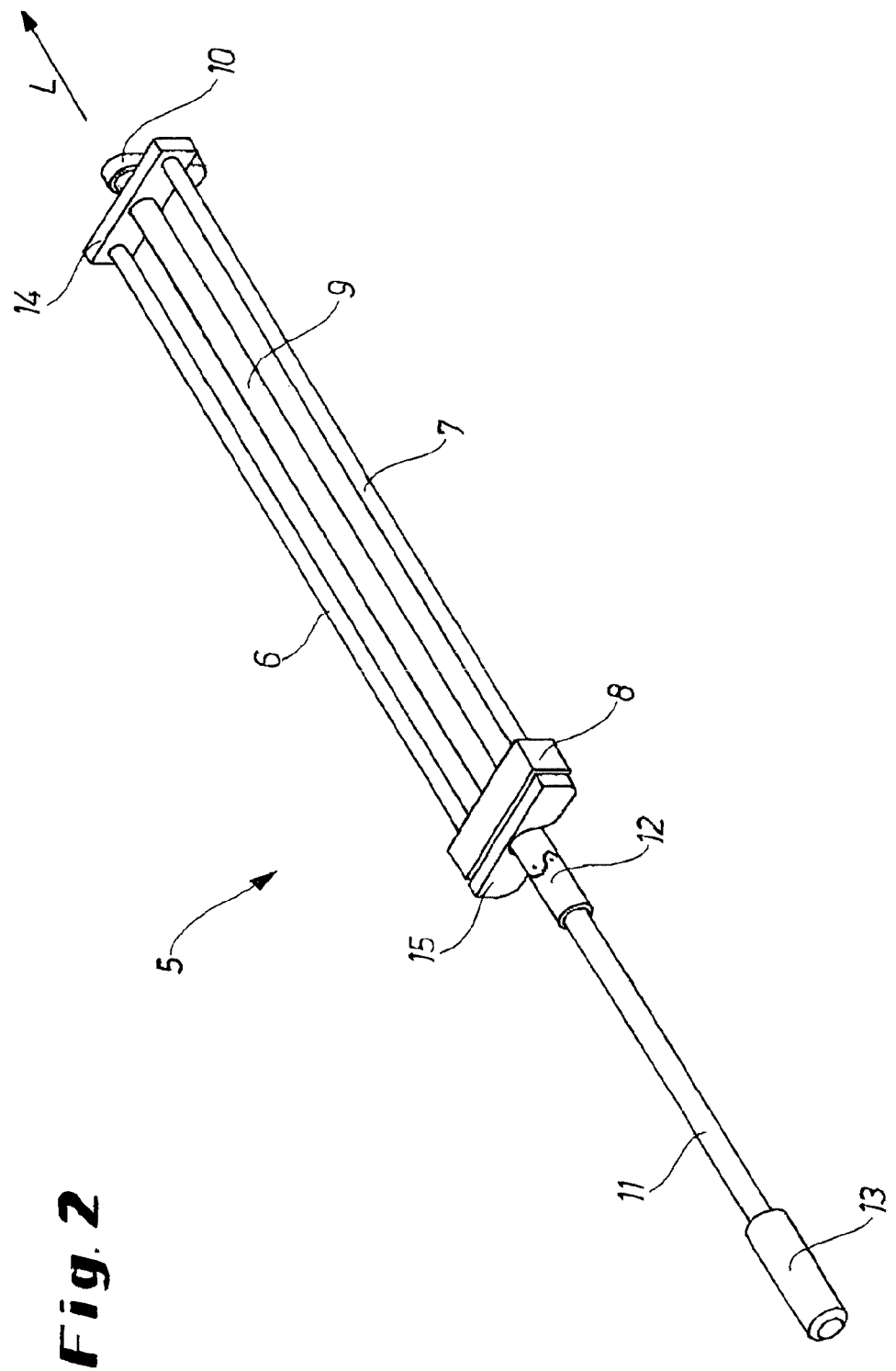
FIG. 2 is a perspective view of the trolley-handling device in a retracted position.

In FIGS. 1 and 2 the trolley-handling device 5 is shown in an extended position and in a retracted position.

The trolley-handling device 5 has a linear guide 6, 7, 8 that comprises two guiding bars 6 and 7 that are stationary mounted in the trolley container. On the guiding bars 6, 7 a slide 8 is provided that can move in a longitudinal direction L. Two stops 14 and 15 limit the movement of the slide 8.

A pulling and pushing bar 9 is axially fixed at the slide 8 but it can rotate around its longitudinal axis L. A hook 10 is at the distal end of the pulling and pushing bar 9 remote from the slide 8.

Furthermore, a handling bar 11 is axially fixed at the slide 8 (alternatively at the pulling and pushing bar 9). A joint 12 being a cardan joint is between the handling bar 11 and the slide 8 (or alternatively the pulling and pushing bar 9), so that the handling bar 11 and the pulling and pushing bar 9 are axially connected and are rotationally coupled; this means a rotation of the handling bar 11 is transferred to the pulling and pushing bar 9. The end of the handling bar 11 is equipped with a handling grip 13.

Figure 3:
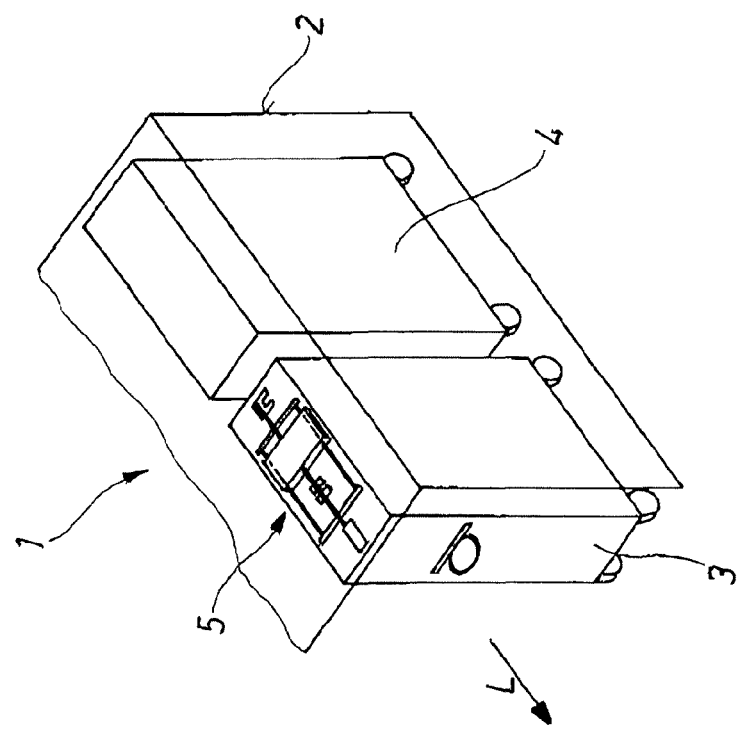
FIG. 3 is a perspective view of two trolleys that are in a trolley container.

Thus, by rotating of the handling grip 13 around the axis of the handling bar 11 (identical with the longitudinal direction L in FIGS. 2 and 3) also the pulling and pushing bar 9 is rotated and also the hook 10 rotates from the position as shown in FIG. 2 to the position as shown in FIG. 3 and vice versa. That is, the hook 10 can be brought into engagement with a trolley to pull it out of the trolley container 2 and push it back into the same.

The stop 14 is provided in such a manner that a rotational movement of the pulling and pushing bar 9 allows a proper engagement of the hook 10 into the trolley 3 when the slide 8 reaches this stop 14.

Due to the joint 12 the handling bar 11 can be angled as far as necessary to allow an easy handling of the trolley-handling device 5.

Figure 4:
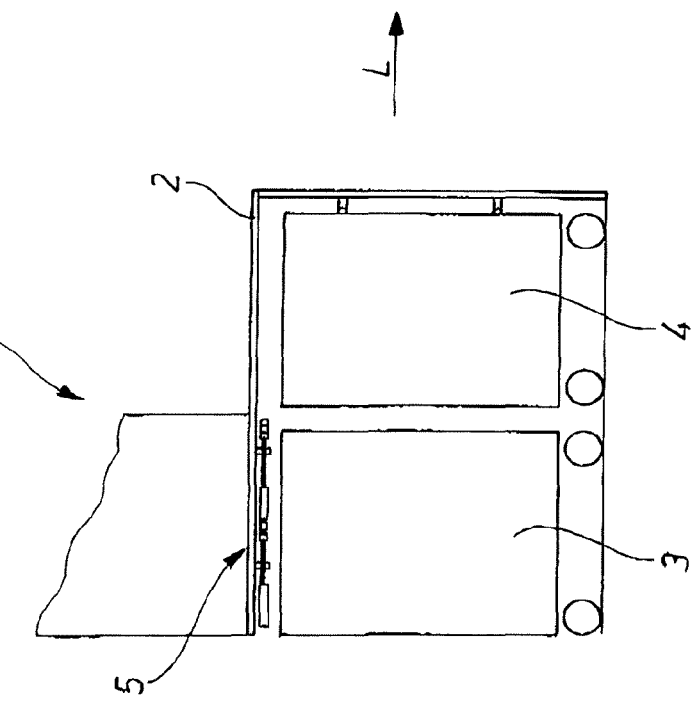
FIG. 4 is a side view of two trolleys that are in the trolley container.

The trolley-handling device 5 is above the trolleys 3, 4 in the trolley container 2. This is shown in FIG. 3 and FIG. 4.

In FIG. 5 an alternative design of the trolley-handling device 5 is shown. Here, the distal end of the pulling and pushing bar 9 is equipped with two hooks 10 that are set at a spacing a. Also the handling grip 13 is here designed in another manner.

The operation of the trolley-handling device 5 is depicted in FIGS. 6a to 6d. If the trolleys 3, 4 have to be taken out from the trolley container 2 at first the front trolley 3 is taken out conventionally by hand, see FIG. 6a. Then, the rear trolley 4 has to pulled out of the trolley container 2 by use of the trolley-handling device 5. This is shown in the FIGS. 6b to 6d.

Figure 6B:
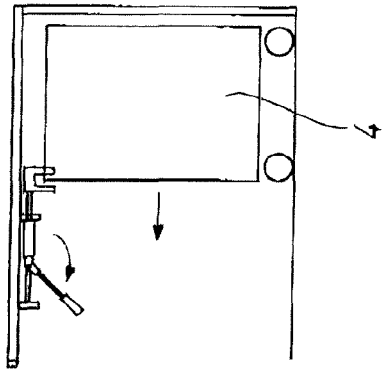
FIG. 6*b* is a side view of the container at a later stage during taking out the trolleys from the trolley container.

By a rotational movement of the handling bar 11—using the handling grip 13—the hook 10 is engaged into the trolley 4, see FIG. 6b. Then the trolley 4 is pulled out by pulling the handling grip 13. The joint 12 allows an easy handling due to the possibility to swivel the handling bar 11 into a convenient position for use.

The trolley 4 can then be easily pulled out of the container 2 in a conventional way.

Figure 6D:
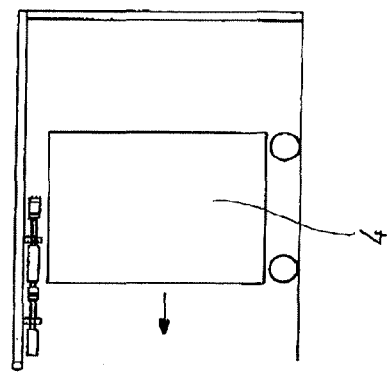
FIG. 6*d* is a side view of the trolley container at a later stage as in FIG. 6*c*.
Figure 6A:
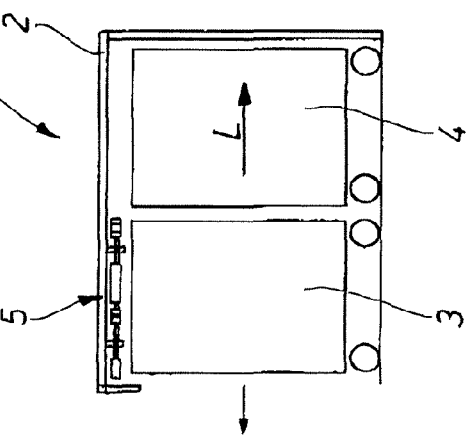
FIG. 6*a* is a side view of two trolleys that are in the trolley container.
Figure 6C:
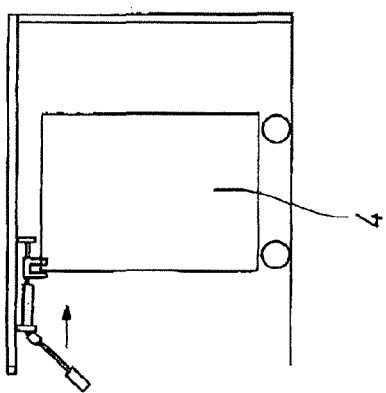
FIG. 6*c* is a side view of the trolley container at a later stage as in FIG. 6*b*.

If the trolley-handling device 5 is no longer necessary (see FIGS. 6c and 6d) the hook 10 can be rotated back out of engagement with the trolley 4 and the device 5 can be brought back into the non-use position (see FIG. 6d).

Inserting of a trolley 4 into the container 2 takes place accordingly by carrying out the steps in the reverse order.

The joint 12 is used to absorb vertical forces that can be created during operation. So, the handling bar 11 remains movable and it is prevented that the mechanism is exposed to too high loads (transverse to the longitudinal direction). This is also beneficial for the user because he or she can hold the handling grip according to the body height conveniently in the right height.

Figure 7:
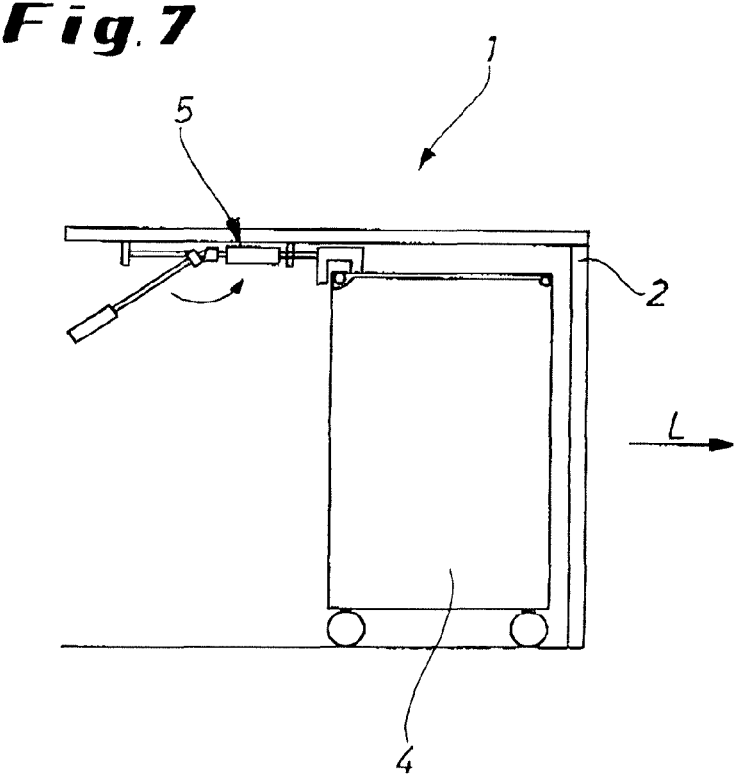
FIG. 7 is a side view of a trolley in the trolley container.

Furthermore, it is possible to provide a stop for the swivel angle of the handling bar in the joint 12, so that a maximum angle is defined. Alternatively a joint with a predetermined angle can be employed, see FIG. 7.

In distinction to pre-known devices with flexible pulling rods the proposed trolley-handling device 5 allows not only the application of pulling forces but also of pushing forces that allow a proper insertion of the trolley into the trolley container.

For the design of the hook 10 different embodiments are suggested. The hook 10 is responsible for engaging with the trolley to be pulled out or pushed into the container.

Figure 8:
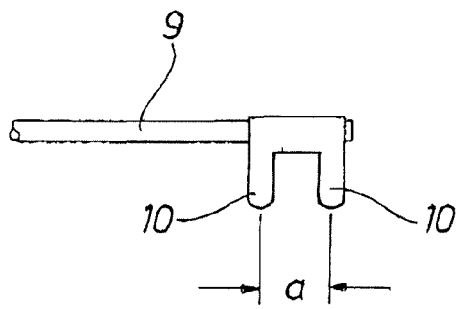
FIG. 8 is a side view of the end of the pulling and pushing bar of the trolley-handling device with two hooks at a distal end.

To hold the trolleys secure during all flight conditions it is preferred that the pulling and pushing bar 9 is equipped with two hooks 10 as shown in FIG. 8. The two hooks 10 are parallel and at a defined distance a. The hooks 10 surround the trolley grip. So, the trolley is secured in both moving directions and cannot roll out from the container unintentionally.

Figure 9:
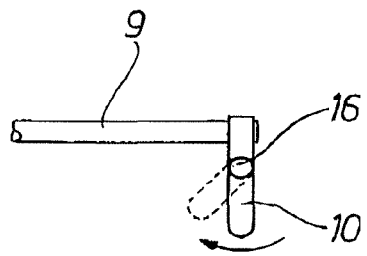
FIG. 9 is a side view of the end of the pulling and pushing bar of the trolley-handling device with one hinged hook at a distal end.
Figure 13D:
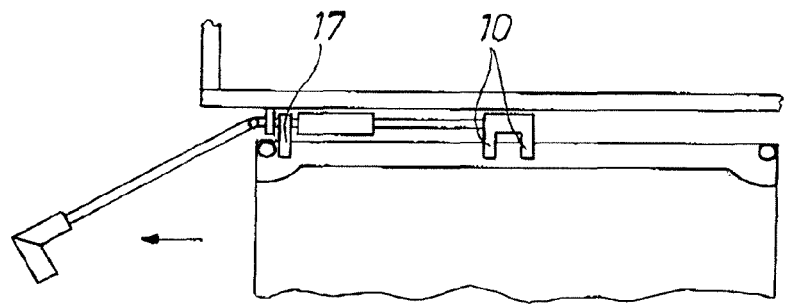
FIG. 13d is a side view of the trolley container at a later stage as in FIG. 13c.
Figure 13E:
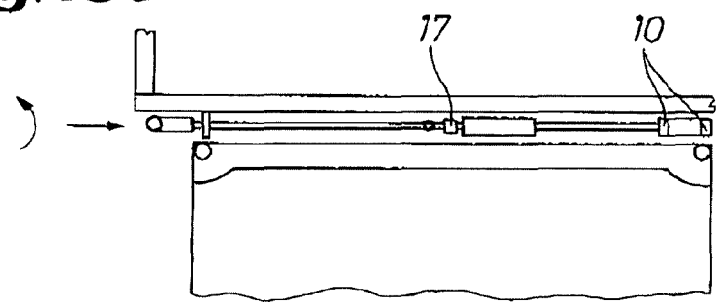
FIG. 13e is a side view of the trolley container at a later stage as in FIG. 13d.

In FIG. 9 another embodiment is shown. Here the hook or the hooks 10 are equipped with a hinge joint 16 that has a spring (not depicted) that biases the hook 10 in the position shown in FIG. 9 with full lines; the deflected position is shown with broken lines. So the hook 10 latches automatically into the trolley grip (at least in one moving direction).

In FIGS. 10, 11 and 12 different designs of the handling grip 13 are shown. The handling grip 13 is the actuation element of the trolley-handling device 5.

A first embodiment according to FIG. 10 has a cylindrical rotational body coaxial to the handling bar 11. Here, the handing grip is not in the movement space of the trolleys in any status of the movement of the same. To recognize the position of the handling bar 1 and thus of the hook(s) 10 a visual mark can be provided at the handling grip 13.

Further embodiments are shown in FIGS. 11 and 12 where the handling grip 13 is L-shaped of T-shaped. Here, the ergonomics are improved because the actuation forces are reduced. Also, the position of the handling bar 11 and thus of the hook(s) can be seen directly.

In FIGS. 13a to 13e a further embodiment of the invention is shown that comes up with a further hook 17.

Here it is provided that an additional hook 17 is adjacent to the joint 12 that is approximately in the position of a half-size trolley. With the above described solution a trolley 4 can be taken out of the container 2 only until a certain position. With the equipment of the further hook 17 it becomes possible to pull out a trolley more convenient. With the additional hook 17 it becomes possible to extract a trolley further until the front of the container 2 by a second movement of the trolley-handling device and the handling bar 11 respectively and using the hook 17. So the comfort of handling is further improved. The user has not to grip into the container 2 to pull out a trolley completely.

This is depicted by the subsequent FIGS. 13a to 13e.

Figure 14:
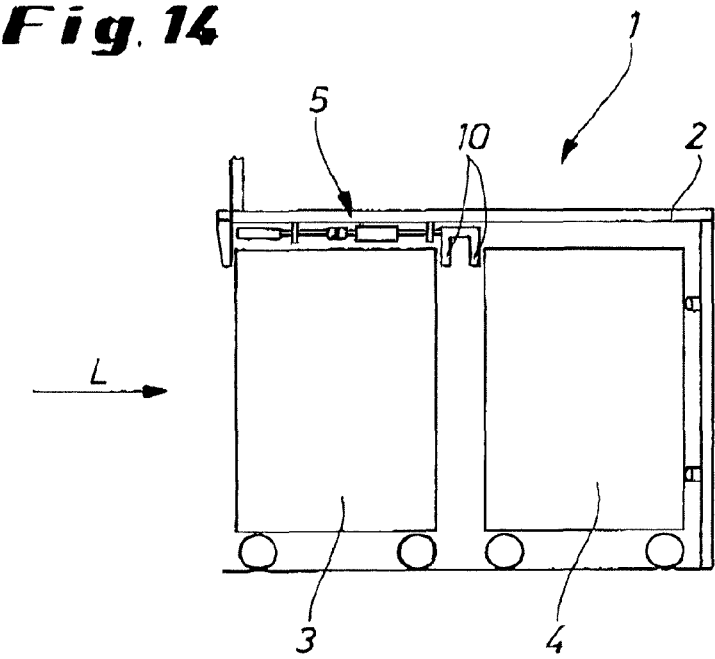
FIG. 14 is a side view of the trolley container with two trolleys in it a stored position.

A longitudinally effective securing element for the trolleys can be relinquished by the further embodiment according to FIG. 14. Here, the hooks 10 are designed in such a manner that the outer dimension between the two hooks corresponds to the distance of the trolleys 3, 4 in the resting position. So the resting position is defined when the trolley-handling device 5 is in the position as shown in FIG. 14. Thus, the hooks 10 are located in the resting position as shown; this position is thereby secured. So, an additional securing element can be avoided.

Figure 15:
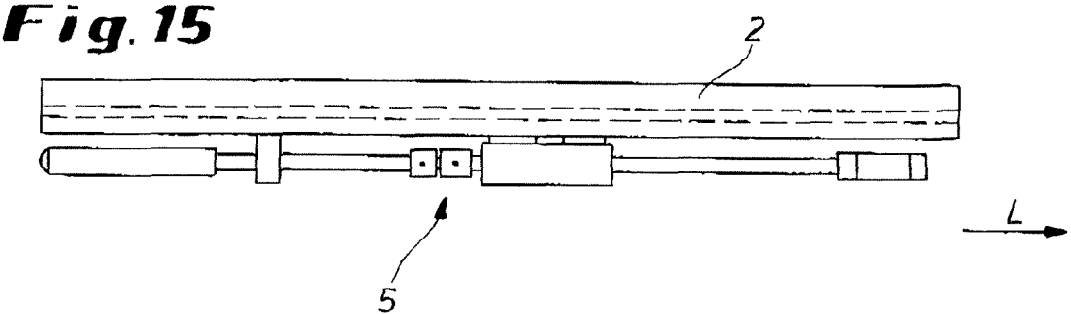
FIG. 15 is a side view of the trolley-handling device according to an alternative embodiment.
Figure 16:
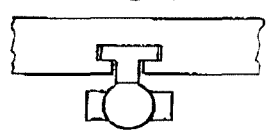
FIG. 16 is a cross section perpendicular to the longitudinal direction through the trolley-handling device.

The beneficial placement of the trolley-handling device 5 in the trolley container 2 is shown in. FIGS. 15 and 16. Here, the linear guide is integrated in the bottom side of the cover of the trolley container 2 and above the trolleys. By doing so, weight can be saved. Thus, in this case the guiding bar (only one in this case) is established by the cover of the trolley container itself.

Figure 17:
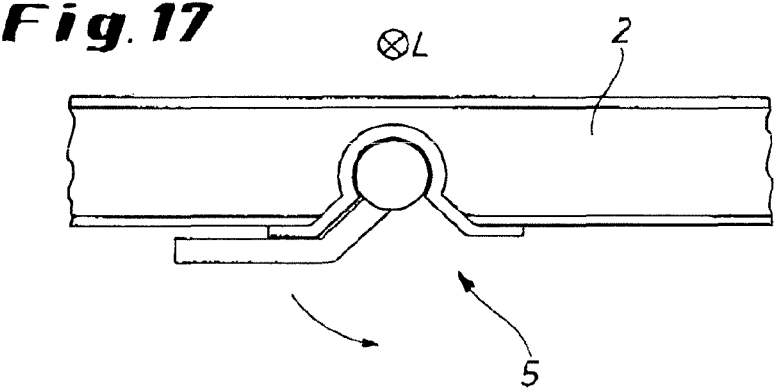
FIG. 17 is a cross section perpendicular to the longitudinal direction through the trolley-handling device according to a further alternative embodiment of the invention in a first position.
Figure 18:
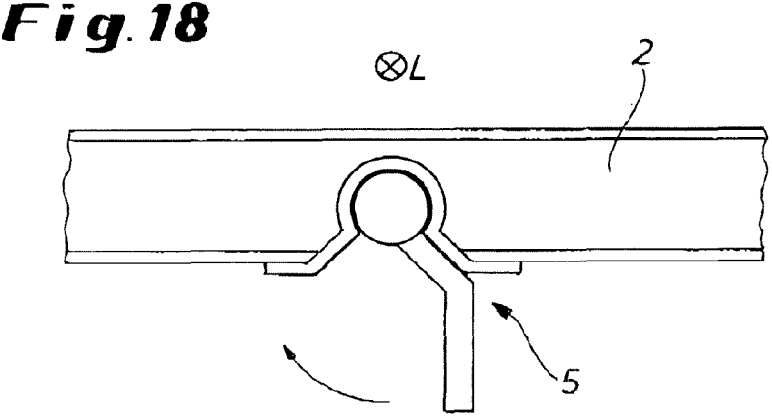
FIG. 18 is the cross section perpendicular to the longitudinal direction through the trolley-handling device according to the further alternative embodiment of the invention in a second position.

An alternative design of this concept is shown in FIGS. 17 and 18.

So, a light-weight device is available that allows an easy handing of the trolleys 3, 4 during their movement into and out of the trolley container.

In FIG. 19 again a trolley arrangement 1 of a galley of an aircraft is shown. The arrangement comprises the trolley container 2 in which again two trolleys 3, 4 (trolley 4 cannot be seen) can be arranged one after another. At the bottom side of the top plate of the trolley container 2 the trolley-handling device 5 (only the handling grip 13 can be seen) is provided that allows the easy pulling out and pushing in of the trolleys 3, 4 from and into the trolley container 2. During handling of the trolleys 3, 4, they are moved into a longitudinal direction L. The trolley-handling device 5 is shown in the stored position and can be reached from the galley front 18.

Figure 19:
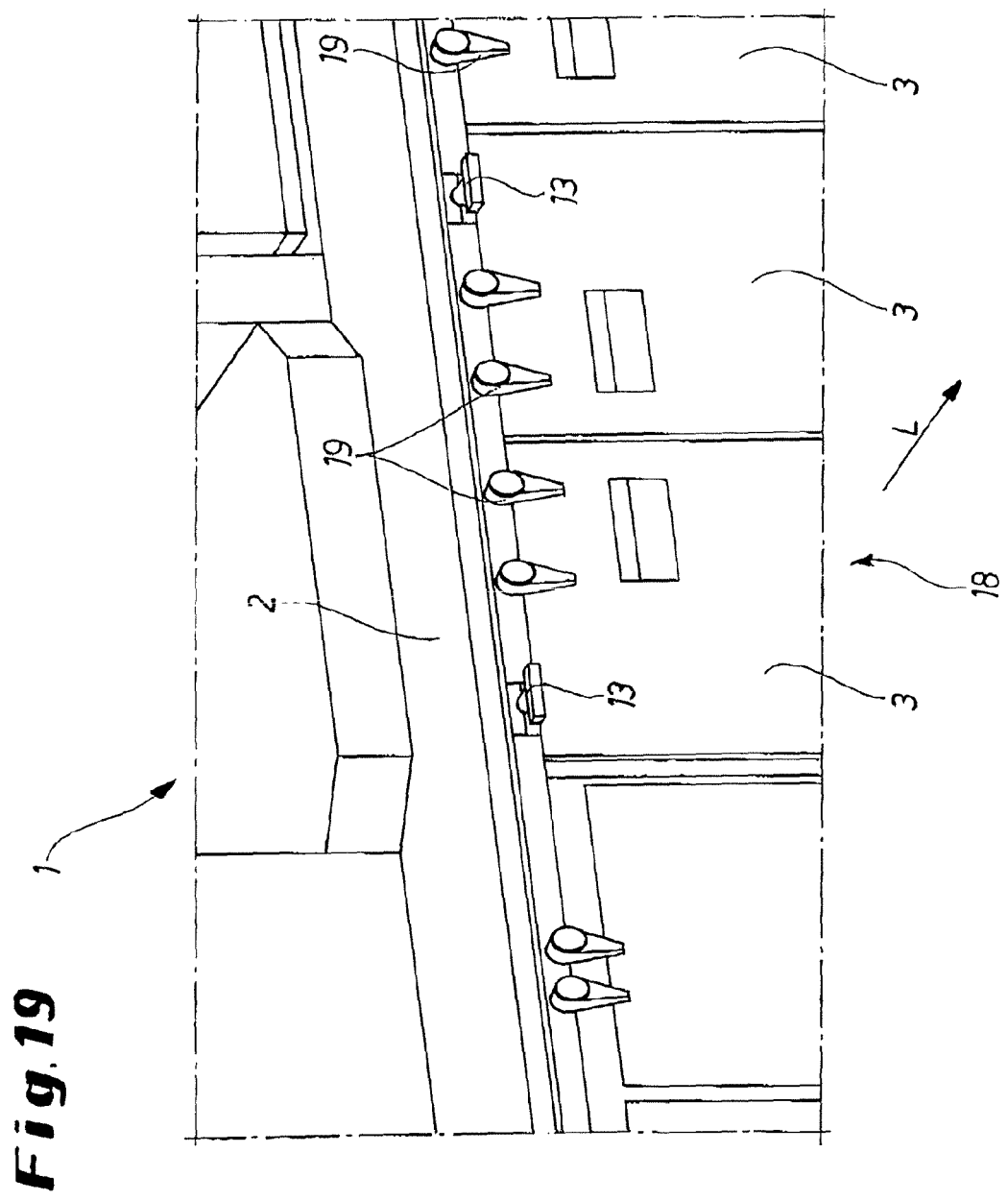
FIG. 19 is a perspective view of a galley provided in an aircraft, wherein a trolley arrangement according to the invention is depicted.

As can also be seen in FIG. 19 locking bolts 19 for locking of the trolleys are arranged. The handling grips 13 as well as the locking bolts 19 are at the same height and can be easily seen by the cabin crew.

By the proposed design it is possibly to pull out trolleys from the rearmost position of the container in a convenient manner, i.e. without grabbing deep into the container.

The joint 12 allows that pressure forces can be transferred for pushing a trolley into the container. Also by use of the joint it is avoided that vertical and lateral forces coming from the user of resulting from the flight can damage the device.

The proposed device is useful for the aircrew as well as for ground staff during loading of aircraft galleys in the case of trolley containers that contain more than 1.5 trolleys one after the other.

The invention claimed is:

1. A trolley arrangement for a galley of an aircraft, wherein the trolley arrangement comprises:
    a trolley container in which at least two trolleys can be arranged in a longitudinal direction, and
    a trolley-handling device for pulling and pushing a trolley longitudinally into the trolley container and including
        a linear guide with at least one stationary guiding bar and a slide movable along the at least one guiding bar longitudinally,
        a pulling and pushing bar extending along a longitudinal axis, axially fixed on the slide, but rotatable about the longitudinal axis,
        at least one hook at a distal end of the pulling and pushing bar remote from the slide,
        a handling bar axially fixed on the slide or on the pulling and pushing bar, and
        a joint between the handling bar and the slide or the pulling and pushing bar, so that the handling bar and the pulling and pushing bar are axially connected and are rotationally coupled.

2. The trolley arrangement according to claim 1, wherein the joint is a cardan joint.

3. The trolley arrangement according to claim 1, wherein the joint has a stop that limits an angle between the pulling and pushing bar and the handling bar.

4. The trolley arrangement according claim 1, wherein the trolley-handling device is in an upper region of the trolley container at its inner side.

5. The trolley arrangement according to claim 1, further comprising:
    a handling grip at a distal end of the handling bar remote from the slide.

6. The trolley arrangement according to claim 5, wherein the handling grip is at the same height as at least one locking bolt at a galley front for locking of the trolleys in the trolley container.

7. The trolley arrangement according to claim 1, wherein the trolley-handling device furthermore comprises
two stops that limit the movement of the slide longitudinally.

8. The trolley arrangement according to claim 1, wherein only a single hook at the distal end of the pulling and pushing bar.

9. The trolley arrangement according to claim 1, wherein there are two of the hooks are at the distal end of the pulling and pushing bar.

10. The trolley arrangement according to claim 9, wherein the two hooks are parallel to each other and at a defined spacing.

11. The trolley arrangement according to claim 9, further comprising:
a hinge carrying at least one of the two hooks on the pulling and pushing bar.

12. The trolley arrangement according to claim 11, wherein the hinge comprises a spring element that biases the one hook against a stop.

13. The trolley arrangement according to claim 9, further comprising:
a further hook at the pulling and pushing bar adjacent to the joint.

14. The trolley arrangement according to claim 1, wherein the linear guide has two of the stationary guiding bars that are parallel to each other and extend longitudinally.

* * * * *